United States Patent [19]
Fellows

[11] Patent Number: 5,048,653
[45] Date of Patent: Sep. 17, 1991

[54] SIDE MOUNT GARAGE DOOR RELEASE

[76] Inventor: Jerry W. Fellows, 14 Pleasant Ct., Walnut Creek, Calif. 94596

[21] Appl. No.: 556,614

[22] Filed: Jul. 23, 1990

[51] Int. Cl.⁵ .............................................. F16D 11/00
[52] U.S. Cl. .................................... 192/67 P; 192/108
[58] Field of Search .............. 192/67 P, 108; 474/903, 474/902; 160/9, 188; 49/199, 200

[56] References Cited

U.S. PATENT DOCUMENTS

| | | | |
|---|---|---|---|
| 1,425,792 | 8/1922 | Pignani et al. | 192/67 P |
| 3,066,729 | 12/1962 | Gessell | 160/193 |
| 3,336,968 | 8/1967 | Curtis | 160/188 |
| 3,512,302 | 5/1970 | Sivin et al. | 49/139 |
| 4,472,910 | 9/1984 | Iha | 49/139 |
| 4,504,094 | 3/1985 | Burrows | 192/67 P X |
| 4,541,609 | 9/1985 | Smith | 192/67 P X |
| 4,553,652 | 11/1985 | Fallos | 192/67 P X |
| 4,605,108 | 8/1986 | Monot | 192/0.02 |
| 4,667,789 | 5/1987 | Cucchi et al. | 192/67 P X |
| 4,832,184 | 5/1989 | DeGood | 192/67 P X |

Primary Examiner—Rodney H. Bonck
Attorney, Agent, or Firm—Schapp and Hatch

[57] ABSTRACT

A release apparatus for selectively connecting and disconnecting a sprocket drive wheel from a driven shaft by selectively thrusting a pair of sprag pins through registering openings in the sprocket wheel and into peripheral recesses in a collar secured to the drive shaft. The portion of the device attached to the sprag pins is also attached to the drive shaft for joint rotation.

5 Claims, 1 Drawing Sheet

SIDE MOUNT GARAGE DOOR RELEASE

BACKGROUND OF THE INVENTION

1. Field of the Invention.

This invention relates to apparatus for opening and closing garage doors of the side mount type wherein the motor is mounted at the side of the door and operates through a sprocket and chain to open and close the door. More particularly, this invention relates to devices for releasing the door mechanism from the drive mechanism should the drive become inoperative.

2. Description of the Prior Art

Present garage door openers are normally of either the center drive type wherein the motor and drive apparatus is mounted midway between the sides of the door on the ceiling of the garage, or the side mount type wherein the motor and driving apparatus are mounted at one side of the door and driving is accomplished through a sprocket chain assembly. Such garage door openers sometimes become inoperative because of power failures, motor failures and the like. In such circumstances it is still necessary that the garage door be opened and closed and that provision be made for doing so manually.

In order to accomplish manual opening and closing, it becomes necessary to disconnect the drive motor, reduction gears and the like from the door support mechanism. Otherwise, the mechanical characteristics of the motor and gears offers such resistance that manual opening and closing of the doors becomes extremely difficult, if not impossible.

Typically, known side mount door operators are provided with a clutch mechanism between the drive motor and the drive shaft which can be disengaged by various mechanisms so as to disconnect the motor from the drive shaft and thus allow the door to be manually opened or closed. An example of such device is found in U.S. Pat. No. 4,472,910 issued to Kiyoshi Iha on Sept. 25, 1984.

The clutch mechanisms provided in the prior art patents are complicated, expensive, difficult to operate, and are known to get out of order when needed most. Examples of such clutch mechanisms may be found in U.S. Pat. No. 3,066,729 to Glenn P. Gessell, issued Dec. 4, 1962; U.S. Pat. No. 3,512,302 issued to Bernard J. Sivin et al. on May 19, 1970; and U.S. Pat. No. 4,605,108 issued to Bernard Monot on Aug. 12, 1986.

The above-listed patents are believed to be relevant to the present invention because they were adduced by a prior art search made by an independent searcher, and a copy of each of the above-listed patents is supplied to the Patent and Trademark Office herewith.

SUMMARY OF THE INVENTION

The present invention provides a release mechanism by which the drive sprocket can be selectively engaged with the motor driven shaft for joint rotation therewith, or may be released so that the sprocket wheel can rotate freely, or "freewheel", on the driven shaft. Coupling of the sprocket wheel to the driven shaft for joint rotation therewith is accomplished by a member secured to the driven shaft adjacent to the sprocket and having a plurality of sprag pins projecting axially of the driven shaft in the direction of the sprocket.

The sprocket wheel is formed with a plurality of bores therethrough through which the sprag pins may be engaged. A collar is secured to the shaft on the side of the sprocket wheel opposite to the clutch member, and this collar is formed with a plurality of recesses in its periphery positioned for receiving the ends of the sprag pins remote from the clutch member. In this position, the mechanism is "locked up" and the sprocket wheel is secured for joint rotation to the driven shaft when the sprag pins are projecting through the bores in the sprocket wheel and are engaged in the recesses in the collar. When the sprag pins are withdrawn from the bores in the sprocket wheel and the recesses in the collar, the sprocket wheel is released so it can freewheel on the shaft and offer no resistance to manual operation of the door mechanism.

Release means is provided for selectively withdrawing the sprag pins, this release means comprising an axially extending member enclosed in a housing and encircled by spring means in the housing biasing the member and its sprag pins toward the sprocket wheel. A stem protrudes from the end of the housing opposite to the sprocket wheel and is provided with an eye to which a pull cord may be attached so that the release may be quickly and effectively operated from a distance.

It is therefore a principal object of the present invention to provide a side mount garage door release mechanism which is capable of quickly and effectively either securing the sprocket wheel to the driven shaft for rotation, or freeing the sprocket wheel from the driven shaft so it may freewheel thereon.

Another object of the present invention is to provide a side mount garage door release of the character described in which the parts are simple and sturdy and the apparatus is free of intricate mechanisms.

Other objects and features of advantage will become apparant as the specification progresses and from the claims.

Figure 1:
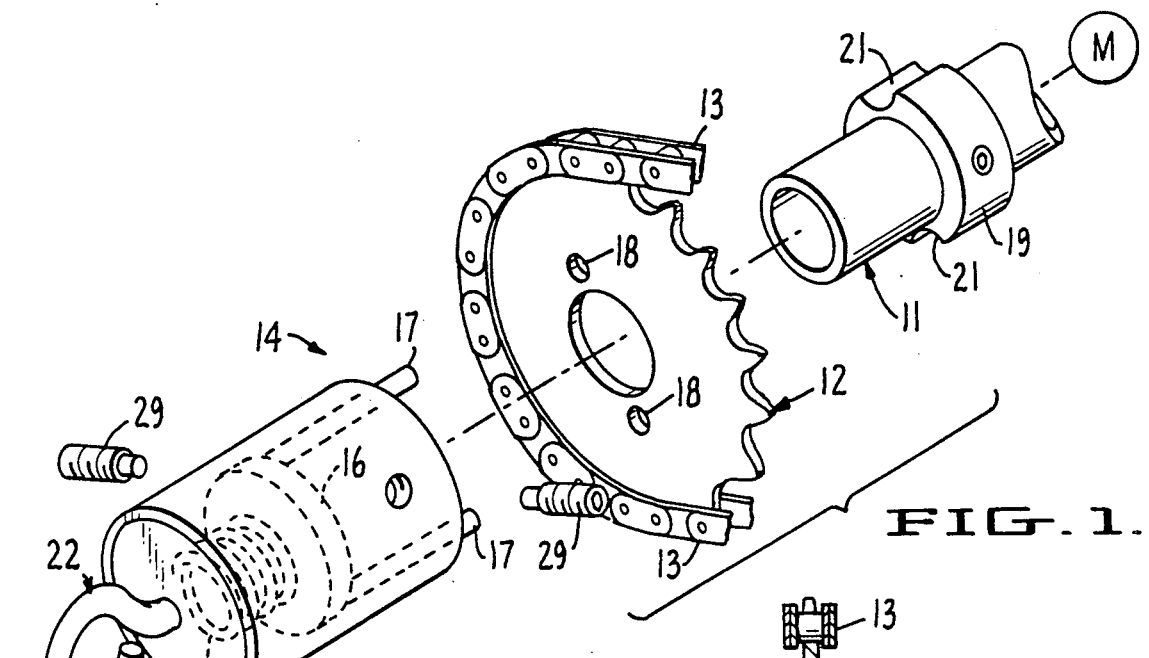
FIG. 1 is an exploded perspective view of a side mount garage door opener release mechanism constructed in accordance with the present invention.
Figure 2:
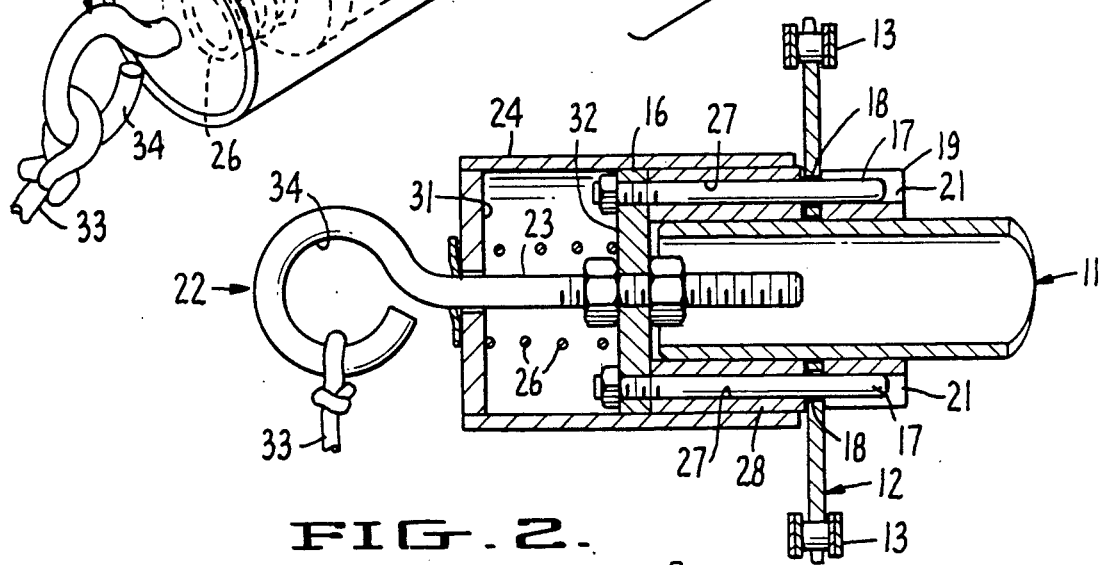
FIG. 2 is a vertical, longitudinal cross-sectional view of the mechanism of FIG. 1 in assembled condition and securely locking the sprocket wheel to the driven shaft for joint rotation.

While only the preferred form of the invention is illustrated in the drawings, it will be apparent that various modifications could be made without departing from the ambit of the claims.

DESCRIPTION OF THE PREFERRED EMBODIMENTS

As may be seen in the accompanying drawing, the side mount garage door opener of the present invention is mountable on a motor driven shaft 11 capable of driving a sprocket wheel 12 for opening and closing a garage door by means of a sprocket chain 13, and provides means 14 for selectively coupling the sprocket wheel 12 to the shaft 11 for joint rotation and for selectively decoupling the sprocket wheel 12 from the shaft 11 to permit free movement of the garage door mechanism.

The means 14 here comprises a clutch member 16 secured to the shaft 11 adjacent to the sprocket wheel 12 and having a plurality of sprag pins 17. The sprocket wheel 12 is formed with a plurality of bores 18 therethrough in position for engagement by the sprag pins 17. A collar 19 is secured to the shaft 11 on the side of the sprocket wheel 12 opposite to the clutch member 16. The collar 19 is formed with a plurality of recesses 21 in its periphery which are positioned for receiving the ends of the sprag pins 17 remote from the clutch member 16 so that the sprocket wheel 12 is secured for joint rotation to the shaft 11 when the sprag pins 17 are projecting through the bores 18 in the sprocket wheel and are engaged in the recesses 21 collar 19. When the sprag pins 17 are withdrawn and no longer project through the bores 19 in sprocket wheel 12 and into the recesses 21 in collar 19, the sprocket wheel 12 is no longer connected to the driven shaft 11 for joint rotation therewith, but instead can rotate freely on the shaft 11 so that rotation of the sprocket member 12 is not resisted.

Release means 22 is provided for selectively withdrawing the sprag pins 17 from the bores 18 and recesses 21. The release means 22 provides an axially extending member or stem 23 concentrically positioned within a tubular housing 24, and spring means, here in the form of a compression spring 26, biases the clutch member 16 to the right, as viewed in the drawings, for causing clutch means 16 to slide within housing 24 and urge the sprag pins 17 through the bores 18 and into the recesses 21 in the collar 19. Bores 27 are provided in a ring-shaped member 28 which is secured to housing 24 and is axially slidable on driven shaft 11. Member 28 is releasably secured to shaft 11 by set screws 29. Compression spring 26, pressing against the interior surface 31 of the housing 24 and the anterior surface 32 of the clutch member 16, urges the sprag pins 17 tot he right as viewed in the drawings and into their engaged position.

Figure 3:
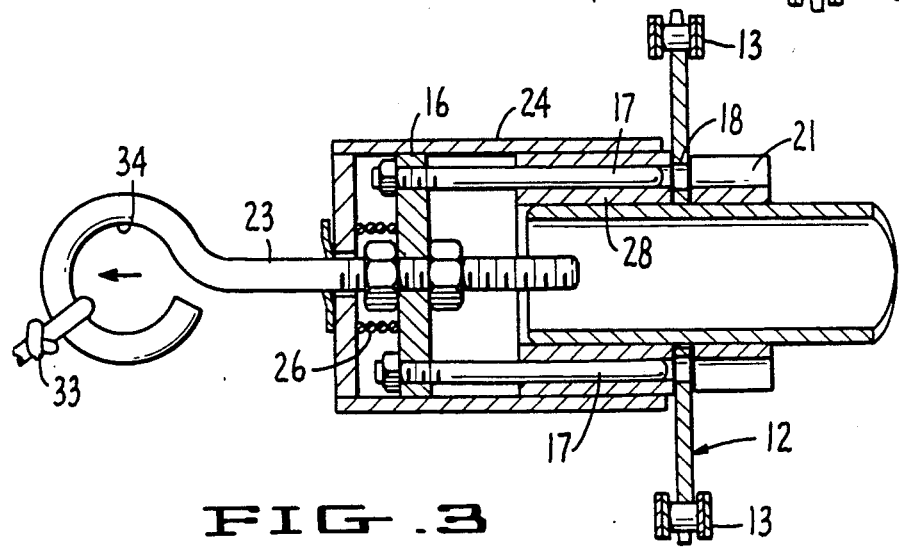
FIG. 3 is a view similar to that of FIG. 2 but illustrating the mechanism in its release position wherein the sprocket wheel is released from the driven shaft and may freewheel thereon.

When it is desired to effectuate release of the sprocket wheel 12 from the driven shaft 11, as when a power failure occurs, anyone present can simply grasp a cord 33 fastened to an eye 34 formed on the end of stem 23 outside of the housing 24. Pulling on the stem 23 causes the stem 23 and clutch member 16 to move to the left as viewed in FIG. 3 where, with the sprag pins 17 withdrawn from the bores 18, the sprocket wheel 12 is no longer influenced by rotation or non-rotation of driven shaft 11 and can freewheel thereon.

From the foregoing it will be apparent that the release device for side mount garage door openings of the present invention provides a sturdy and effective novel solution to the problem of coupling and decoupling the sprocket wheel from the driven shaft 11.

What is claimed is:

1. In a side mount garage door opener having a motor driven shaft for opening and closing the door by means of a sprocket chain, the combination of
   a sprocket wheel adapted for engagement with such sprocket chain and rotatably carried by such motor-driven shaft,
   and means for selectively coupling said sprocket wheel to said shaft for joint rotation and for selectively decoupling said sprocket wheel from said shaft, comprising
   a clutch member adapted for securing to said shaft adjacent to said sprocket wheel and having a plurality of sprag pins projecting axially of said shaft in the direction of said sprocket wheel,
   said sprocket wheel being formed with a plurality of bores in position for receiving said sprag pins therethrough,
   a collar adapted for securing to said shaft on the side of said sprocket wheel opposite to said clutch member,
   said collar being formed with a plurality of recesses positioned for receiving the ends of said sprag pins remote from said clutch member whereby said sprocket wheel is secured for joint rotation to said shaft when said sprag pins are projecting through said bores in said sprocket wheel and are engaged in said recesses in said collar and whereby said sprocket wheel freewheels on said shaft when said sprag pins are not projecting through said bores in said sprocket wheel.

2. In a side mount garage door opener of the character described in claim 1, the combination further comprising
   release means for selectively withdrawing said sprag pins from said bores in said sprocket wheel and from said recesses in said collar.

3. In a side mount garage door opener as described in claim 2, the combination further comprising
   an axially extending stem member,
   a housing surrounding one end of said stem member,
   and spring means in said housing for biasing said stem member and said sprag pins in the direction of said sprocket wheel.

4. In a side mount garage door opener as described in claim 3, the combination further comprising
   a member axially reciprocable in said housing and carrying said sprag pins,
   said housing and said last named member having confronting surfaces internally of said housing,
   and a compression coil spring compressed within said housing between said confronting surfaces.

5. A side mount garage door opener as described in claim 4 in which said stem member is formed with an eye to which a pull cord may be secured.

* * * * *